United States Patent [19]

Elliott

[11] Patent Number: 5,895,076
[45] Date of Patent: Apr. 20, 1999

[54] HOSE COUPLING SHROUD

[75] Inventor: Joseph S. Elliott, Hobart, Ind.

[73] Assignees: Tyler J. Elliot; Joseph Scott Elliot, both of Hobart, Ind.

[21] Appl. No.: 08/743,056

[22] Filed: Nov. 4, 1996

[51] Int. Cl.⁶ .................................................. F16L 11/12
[52] U.S. Cl. .............................. 285/14; 285/45; 285/419
[58] Field of Search .............................. 285/13, 14, 45, 285/419

[56] References Cited

U.S. PATENT DOCUMENTS

| | | | |
|---|---|---|---|
| 315,788 | 4/1885 | Hunter | 285/45 |
| 317,794 | 5/1885 | Jackson | 285/45 |
| 320,683 | 6/1885 | Phillis | 285/45 |
| 345,463 | 7/1886 | Verner | 285/45 |
| 1,790,266 | 1/1931 | Fullmer | 285/45 |
| 2,323,099 | 6/1943 | Patten | 285/14 |
| 3,290,064 | 12/1966 | Bush | 285/45 |
| 3,563,276 | 2/1971 | Hight | 285/14 |
| 3,907,049 | 9/1975 | Baffas | 285/45 |
| 4,541,256 | 9/1985 | Green | 70/232 |
| 4,607,866 | 8/1986 | Erlichman | 285/45 |
| 4,615,543 | 10/1986 | Cannon | 285/12 |
| 4,741,559 | 5/1988 | Berghman | 285/45 |
| 4,930,543 | 6/1990 | Zuiches | 138/110 |
| 5,312,137 | 5/1994 | Nee | 285/14 |

FOREIGN PATENT DOCUMENTS

| | | | |
|---|---|---|---|
| 105956 | 11/1938 | Australia | 285/14 |
| 737740 | 7/1943 | Germany | 285/45 |
| 1022063 | 1/1958 | Germany | 285/45 |
| 496085 | 7/1955 | Italy | 285/14 |
| 318957 | 3/1957 | Switzerland | 285/14 |

*Primary Examiner*—Eric K. Nicholson
*Attorney, Agent, or Firm*—Gary M. Hartman; Domenica N. S. Hartman

[57] ABSTRACT

A hose coupling shroud for enclosing and securing coupled ends of a pair of hoses, particular those of the type used to convey an abrasive media under high pressure. The shroud has tapered portions at oppositely-disposed ends thereof, openings at the oppositely-disposed ends for receiving the hoses, and vents to allow excess pressure and media to be released from the hose coupling shroud in the event of a coupling failure. Radially-projecting ribs within the tapered portions secure the coupled ends of the hoses within the shroud in the event of coupling failure, and form a pair of sealing barriers between the coupled ends and the openings at the oppositely-disposed ends of the shroud. The tapered portions reduce the likelihood that the hose coupling shroud will become snagged on an object as the hoses are pulled through a work environment.

17 Claims, 1 Drawing Sheet

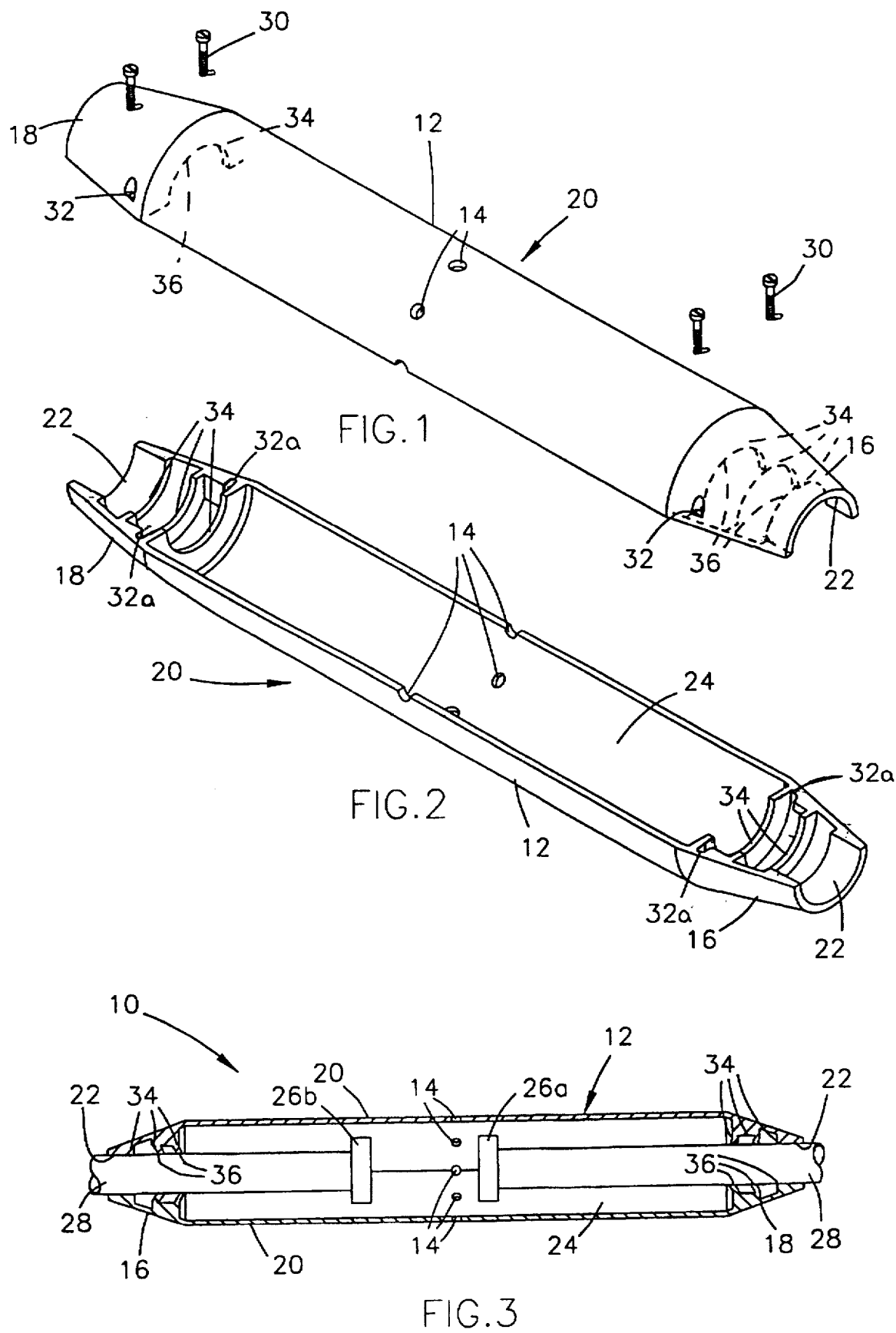

HOSE COUPLING SHROUD

BACKGROUND OF THE INVENTION

1. Field of the Invention

The present invention generally relates to hose couplings. More particularly, this invention is directed to a hose coupling shroud that increases the reliability and safety of hose couplings of the type used to couple hoses through which abrasive media or air flows at high pressures.

2. Description of the Prior Art

Safety shields for cable, pipe and hose couplings have been suggested in the prior art for increasing the reliability and safety of such couplings. For example, U.S. Pat. No. 3,290,064 to Bush discloses a cable coupling shield that is designed to provide an air-tight seal around a cable coupling, such that inert gas may be contained within the shield to prevent the inflow of destructive agents, such as oxygen. Other prior art shields have been employed to protect tubing and pipe joints, such as in the oil and gas drilling industries. For instance, U.S. Pat. No. 4,615,543 to Cannon discloses a latch-type tubing protector adapted to enclose and protect a tubing joint through which oil or gas is transported to the ground surface from a bore hole. The tubing protector includes lugs and shoulders at its opposite ends to retain the tubing joints within the shroud. Still other types of coupling shields are adapted to capture a corrosive fluid leaking from a pipe joint. An example of such a shield is disclosed in U.S. Pat. No. 5,312,137 to Nee. Nee's safety shield forms an enclosure chamber around a pipe joint, and includes ribs running longitudinally along the interior wall of the shield to provide structural reinforcement. Discharge tubes are provided through which accumulated fluid can be removed from the enclosure.

In addition to those noted above, couplings of one type or another have been employed to protect hose couplings for a variety of applications. The structural integrity and reliability of a hose coupling are particularly critical if the substance flowing through the hose would pose a hazard to bystanders if uncontrollably discharged from the coupling in the event of a coupling failure. One such application is sandblasting performed at construction sites, where a number of large interconnected hoses are used to transport an abrasive material, such as steel shot or sand, at high pressures (e.g., about 150 psig) and velocities. Generally, the hoses are joined by corresponding male and female couplings, termed "knuckles," permanently secured to the ends of the hoses. A shortcoming of such knuckles is that they are often bulky, and therefore prone to becoming caught on obstacles as the hoses are being pulled through job site. As such, the user must spend time untangling or unsnagging the knuckles, which reduces the efficiency of the operation. Occasionally, the knuckles become unintentionally uncoupled when snagged or while the user is trying to unsnag the knuckles. The result is that media is uncontrollably released from the end of the hose remaining connected to the supply pump. Because the abrasive media is under high pressure, the free end of the supply hose not only poses a serious danger to bystanders as a result of the high-velocity media being propelled at high velocities, but the hose end is dangerous as it tends to whip violently to and fro. In addition to the potential for the knuckles to become accidentally uncoupled, knuckles occasionally fail catastrophically, either through wear, fatigue or design limitations.

Although shields of the types disclosed by Bush, Cannon and Nee may be suitable for their respective applications, such shields are not well suited to protect sandblasting hose knuckles. Bush's elastic and air-tight shield would be prone to rupturing, particularly when impinged by the abrasive media flowing through a sandblasting hose. Though the lugs and shoulders present in Cannon's shield would allow venting of an abrasive media between the hose and the ends of the shield, and therefore overcome the shortcoming noted for Bush, high-velocity flow of the abrasive around the lugs and shoulders would rapidly erode the lugs and shoulders to the extent that the hoses could eventually pull free of the shield. Finally, while Nee's shield would appear to be capable of containing a catastrophic failure of a sandblasting hose knuckle, the shield is far too bulky to be suitable for use at job sight having numerous obstacles past which the hose must be routed.

From the above, those skilled in the art will appreciate that what is needed is an improved device for protecting a hose coupling of the type through which abrasive materials flow at high pressures. Such a device would preferably be capable of protecting the coupling from damage, while restraining the coupling and containing the abrasive media in the event of a catastrophic failure. In addition, such a device would preferably have a low profile so as not to promote snagging or entanglement of the hose on obstacles in the work environment. Finally, it would be desirable if the device were capable of immediately notifying a bystander of a coupling failure without endangering the bystander.

SUMMARY OF THE INVENTION

It is an object of this invention to provide a protective shroud for a hose coupling, such as a coupling used to connect two hoses through which a substance, such as air, liquid or an abrasive media, flows under high pressure.

It is another object of this invention that such a shroud is configured to increase the reliability and safety of the hose coupling.

It is yet another object of this invention that such a shroud enables bystanders to become aware of a coupling failure.

It is still another object of this invention that such a shroud securely retains the hose couplings within the shroud in the event of a coupling failure.

It is a further object of this invention that such a shroud reduces the likelihood that the hose coupling will become entangled with nearby obstacles.

According to the invention, a shroud is provided that is adapted to enclose and protect a hose coupling. In a preferred application for the invention, the shroud is used to enclose a hose coupling between interconnected hose sections used with sandblasting equipment. The shroud is designed to increase the safety and reliability of the coupling joint by restraining the coupling and containing the sandblasting media in the event of a joint failure.

For this purpose, the shroud of this invention includes a chamber portion having two oppositely-disposed axial ends between which an interior cavity is formed. An opening at each axial end is sized to closely receive one of the hoses, such that the coupling joint between the hoses is positioned within the interior cavity. An important aspect of this invention is that the chamber portion has one or more vent holes that provide a release for pressure and media that would otherwise accumulate within the interior cavity if the coupling were to fail. Accordingly, the shroud of this invention is not intended to completely contain the media if the couplings become uncoupled or the joint otherwise fails. Instead, the shroud is adapted to release pressure and media in a controlled manner. In doing so, bystanders are not exposed to the hazard of high velocity abrasive media spraying from a hose end, but instead become aware of a coupling failure due to the controlled release of media from the shroud.

The oppositely-disposed ends of the chamber portion are tapered in the axial direction, providing for a smooth transition between each hose and the chamber portion of the shroud. Associated with each tapered portion are a number of internal ribs that project radially inward. Each rib defines an aperture that is aligned with the opening at its corresponding axial end of the chamber portion. With the aperture, each rib is configured to sealingly engage one of the hoses. As such, in the event of a coupling failure, the media is prevented from flowing from the interior cavity to the openings at the axial ends of the chamber portion, and is therefore limited to being released through the vent holes in the interior cavity. In addition, the ribs are configured to retain the hoses and couplings within the interior cavity, so as to prevent the couplings from being pulled through the openings.

As can be seen from the above, the shroud of this invention has significant advantages over the prior art. For example, in the event of a coupling failure, the vent holes in the chamber portion enable the controlled release of pressure and media that would otherwise accumulate within the interior cavity. Venting is directed through the vent holes, and not between the shroud and the openings in the axial ends of the shroud, as a result of the ribs being configured to both grip the hoses and form a seal between the shroud and hoses. Therefore, when used in sandblasting applications, pressure and abrasive media are controllably released away from the hoses if a catastrophic failure occurs. While pressure and media are being released, bystanders are quickly alerted that a failure has occurred.

Another advantage of the shroud is the ability of the ribs to positively restrain the hoses and their couplings within the shroud. As such, the shroud does not allow the free end of the supply hose to whip to and fro under the influence of the high-pressure media flowing therethrough, and therefore is prevented from posing a serious hazard to bystanders. Another important advantage of this invention is that the axial ends of the shroud are tapered, providing a gradual transition between the hoses and the coupling joint. Accordingly, the likelihood that the shroud will become snagged or caught on an obstacle present in the work environment is minimal.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIG. 1 shows a prospective view of a half-section of a hose coupling shroud in accordance with a preferred embodiment of this invention;

FIG. 2 is a plan view of the interior of the half-section of FIG. 1; and

FIG. 3 shows the hose coupling shroud of this invention attached to a pair of sandblasting hoses.

DETAILED DESCRIPTION OF THE INVENTION

Shown in the Figures is a hose coupling shroud 10 of this invention. The shroud 10 is composed of two half-sections 20, one of which is shown in FIGS. 1 and 2. When assembled, the half-sections 20 form a chamber portion 12 whose length in the axial or longitudinal direction is greater than its width in the transverse radial direction. Formed near the longitudinal midpoint of each half-section 20 are a number of vent holes 14, shown as having a circular shape though other shapes are possible. The oppositely-disposed axial ends of the chamber portion 12 are tapered, forming first and second frustroconical-shaped tapered portions 16 and 18. When assembled, the half-sections 20 form a cylindrically-shaped interior cavity 24 with an opening 22 at each axial end of the chamber portion 12.

As shown in FIG. 3, the interior cavity 24 is sized to receive a coupling joint formed by a male coupling, or knuckle 26a, coupled with a female knuckle 26b. Each of the knuckles 26a and 26b is attached to a hose 28. In the preferred embodiment, the hoses 28 and knuckles 26a and 26b are of the type used in sandblasting operations, and the hoses 28 convey an abrasive media, such as sand or steel shot, under high pressure. For this application, a suitable longitudinal length for the internal cavity 24 within the shroud 10 is about sixteen inches (about 40 centimeters), though the length of the shroud 10 can vary considerably in order to accommodate any sized knuckle or coupling joint for a particular application and hose configuration. Furthermore, it is apparent that the precise shape of the interior cavity 24 is not critical as long as its shape does not interfere with other desired attributes of the shroud 10.

The half-sections 20 are adapted to be readily assembled and disassembled around the knuckles 26a and 26b, such that the knuckle joint is enclosed and retained within the interior cavity 24 of the chamber portion 12. As shown in the Figures, the half-sections 20 are preferably secured together with L-shaped studs 30 received in bores 32 formed in the upper half-section 20 of FIG. 1. Once the half-sections 20 are assembled, turning the studs 30 causes the lower end of each stud 30 to engage and disengage a shoulder 32a formed on the lower half-section 20 (FIG. 2), and a spring (not shown) serves to bias each stud 30 into engagement with its corresponding shoulder 32a. One skilled in the art will appreciate that other fastening systems could be used.

As also shown in the Figures, a number of ribs 34 are formed within the tapered portions 16 and 18. The ribs 34 are preferably disposed transverse to the longitudinal axis of the shroud 10, i.e., generally in a radial direction, but preferably inclined toward the interior cavity 24 of the shroud 10, as shown in FIG. 3. Because the ribs 34 are located in the tapered portions 16 and 18, those ribs 34 nearest the ends of the shroud 10 have smaller diameters than those farthest from the ends, such that the ribs 34 nearest the openings 22 are more resistant to flexing than are those nearer the vent holes 14. When the half-sections 20 are assembled, each complementary pair of ribs 34 forms an aperture 36 sized to resiliently engage the hoses 26. The combination with their inclined orientation and resilient construction enables the ribs 34 to securely retain the knuckles 26a and 26b within the interior cavity 24 of the shroud 10 and also form a seal between the interior cavity 24 and the axial openings 22 at the tapered portions 16 and 18. The number of ribs 34 necessary to achieve their desired function may vary from that shown in the Figures, though generally at least two ribs 34 in series are preferably present near each opening 22 in order to provide ribs 34 of different flexural characteristics based on their different diameters. In so doing, the combined effect of a series of ribs 34 is to provide sufficient resiliency for sealing purposes while simultaneously providing reliable retention of the hoses 28 and knuckles 26a and 26b. In view of their desired resiliency, the ribs 34 are preferably formed from a plastic or elastomeric material, though it is foreseeable that other materials could be used. In addition, those skilled in the art will appreciate that the entire shroud 10 can be integrally formed from a suitable plastic by injection molding, though other suitable methods could foreseeably be used as dictated by the material and mechanical requirements of the shroud 10.

As noted above, the vent holes 14 are preferably formed near the midpoint of the chamber portion 12. Generally, the preferred location of the vent holes 14 is largely influenced by the desire to vent the interior cavity 24 at a location away from the hoses 28, such that abrasion of the hoses 28 is minimized in the event that the knuckles 26a and 26b become uncoupled or otherwise fail. The size, number and placement of the vent holes 14 required for a particular application will S depend in part on the type and size of media and the operating pressure of the hoses 28. Accordingly, the vent holes 14 shown in the Figures are merely representative, and do not constitute a limitation to the scope of this invention.

In use, the knuckles 26a and 26b at the ends of their respective hoses 28 are coupled and then positioned within one of the half-sections 20 of the shroud 10. In so doing, the ribs 34 engage and surround roughly one-half of the diameter of each hose 28, and the knuckles 26a and 26b reside within the interior cavity 24 adjacent the vent holes 14. The remaining half-section 20 is then positioned over the first half-section 20, such that its corresponding ribs 34 engage and surround the remaining half of each hose 28. The fasteners 30 are then threaded into the bores 32 in the half-sections 20 to secure the half-sections 20 together. As a result, both hoses 28 are retained by the ribs 34 and the knuckle joint formed by the knuckles 26a and 26b is entirely enclosed within the interior cavity 24.

While this invention has been described in terms of a preferred embodiment, it is apparent that other forms could be adopted by one skilled in the art. For example, the appearance and construction of the shroud 10 could be significantly modified from that shown and described, and various materials could be used to form all or some of the structural features of the shroud 10. In addition, this invention could be applied to hoses that carry various fluids, including high pressure air. Accordingly, the scope of our invention is to be limited only by the following claims.

The embodiments of the invention in which an exclusive property or privilege is claimed are defined as follows:

1. A hose coupling shroud for enclosing and securing ends of a pair of hoses through which a substance flows, the hose coupling shroud comprising:

a chamber portion having an axial direction and a radial direction transverse to the axial direction, the chamber portion having a cylindrical exterior shape with an unvarying diameter between oppositely-disposed ends thereof in the axial direction, the chamber portion defining an interior cavity between the oppositely-disposed ends of the chamber portion;

at least one vent opening formed in the chamber portion so as to enable venting of the substance within the interior cavity of the chamber portion to an exterior region surrounding the chamber portion;

oppositely-disposed first and second tapered portions projecting from the oppositely-disposed ends of the chamber portion, the first and second tapered portions defining oppositely-disposed extremities of the hose coupling shroud, the extremities having smaller diameters than the unvarying diameter of the chamber portion, the first and second tapered portions defining a smooth transition between the chamber portion and the extremities of the hose coupling shroud, each of the first and second tapered portions having an opening formed therein, each of the openings being sized to receive one of the pair of hoses; and a rib radially projecting from each of the first and second tapered portions, each of the ribs defining an aperture that is aligned with a corresponding one of the openings in the first and second tapered portions, each of the ribs being configured to sealingly engage one of the pair of hoses so as to prevent the substance from flowing from the interior cavity to the openings in the first and second tapered portions, each of the ribs being configured to secure a corresponding one of the ends of one of the pair of hoses so as to prevent the end of the hose from being pulled from the interior cavity through one of the openings in one of the first and second tapered portions.

2. A hose coupling shroud as recited in claim 1, wherein the chamber portion comprises first and second longitudinal half-portions assembled together so as to form a longitudinal joint between the first and second longitudinal half-portions in the axial direction of the chamber portion.

3. A hose coupling shroud as recited in claim 2, wherein the hose coupling shroud further comprises means for securing the first and second half-portions together.

4. A hose coupling shroud as recited in claim 3, wherein the securing means comprises complementary bores in the first and second longitudinal half-portions, a shoulder in at least one of the first and second longitudinal half-portions, and an L-shaped stud received in each of the complementary bores and engaging the shoulder so as to secure the first and second longitudinal half-portions together.

5. A hose coupling shroud as recited in claim 1, wherein each rib is inclined toward the chamber portion.

6. A hose coupling shroud as recited in claim 1, wherein the chamber portion has a length in the axial direction that is greater than a width of the chamber portion in the radial direction.

7. A hose coupling shroud for enclosing and securing coupled ends of a pair of hoses through which an abrasive material flows, the hose coupling shroud comprising:

housing sections assembled together to form a housing having an interior cavity, a pair of oppositely-disposed ends, and an opening at each of the oppositely-disposed ends, the interior cavity having an axial direction and a radial direction, each of the openings being sized to receive one of the pair of hoses;

vent holes formed in at least one of the housing sections so as to enable venting of the abrasive material from the interior cavity;

oppositely-disposed first and second frustroconical portions formed at the oppositely-disposed ends of the housing; and ribs projecting radially inward from each the first and second frustroconical portions such that ribs nearest the oppositely-disposed ends of the housing have smaller diameters than ribs farthest from the oppositely-disposed ends, the ribs defining apertures that are coaxially aligned with the openings in the oppositely-disposed ends of the housing, the ribs being configured to sealingly engage the pair of hoses so as to prevent the abrasive material from flowing from the interior cavity to the openings in the oppositely-disposed ends of the housing, the ribs being configured to secure the ends of the pair of hoses within the interior cavity and prevent the ends of the pair of hoses from being pulled from the interior cavity through the openings in the oppositely-disposed ends of the housing.

8. A hose coupling shroud as recited in claim 7, wherein each rib is inclined toward the interior cavity.

9. A hose coupling shroud as recited in claim 7, wherein the hose coupling shroud further comprises means for securing the housing sections together.

10. A hose coupling shroud as recited in claim 9, wherein the securing means comprises threaded fasteners.

11. A hose coupling shroud as recited in claim 7, wherein the hose coupling shroud is cylindrical in shape.

12. A hose assembly comprising:

a pair of hoses having coupling ends;

a knuckle attached at the coupling end of each of the hoses, the knuckles forming a coupling joint that couples the hoses together; and a shroud enclosing and securing the coupling joint, the shroud comprising:

a chamber portion having an axial direction and a radial direction transverse to the axial direction, the chamber portion defining an interior cavity between oppositely-disposed ends in the axial direction, the coupling joint being enclosed in the interior cavity;

at least one vent opening formed in the chamber portion so as to enable venting of a substance within the interior cavity of the chamber portion to an exterior region surrounding the chamber portion;

oppositely-disposed first and second tapered portions formed at the oppositely-disposed ends of the chamber portion, each of the first and second tapered portions having an opening formed therein, each of the openings receiving one of the pair of hoses; and a rib projecting radially inward from each of the first and second tapered portions, each of the ribs defining an aperture that is aligned with a corresponding one of the openings in the first and second tapered portions, each of the ribs sealingly engaging one of the pair of hoses so as to prevent the substance from flowing from the interior cavity to the openings in the first and second tapered portions, each of the ribs being configured to retain a corresponding one of the knuckles so as to prevent the knuckle from being pulled from the interior cavity through one of the openings in one of the first and second tapered portions.

13. A hose assembly as recited in claim 12, wherein the chamber portion comprises a pair of housing sections assembled together.

14. A hose assembly as recited in claim 12, wherein the first and second tapered portions are frustoconical-shaped.

15. A hose assembly as recited in claim 12, wherein a plurality of ribs project radially inward from each of the first and second tapered portions, and wherein ribs nearest the oppositely-disposed ends of the chamber portion have smaller diameters than ribs farthest from the oppositely-disposed ends.

16. A hose assembly as recited in claim 15, wherein the ribs define apertures that are all coaxially aligned with the openings in the oppositely-disposed ends of the chamber portion.

17. A hose assembly as recited in claim 15, wherein each rib is inclined toward the chamber portion.

* * * * *